United States Patent [19]

Podrazhansky et al.

[11] Patent Number: 6,097,172

[45] Date of Patent: Aug. 1, 2000

[54] METHOD AND APPARATUS FOR DETERMINING WHEN TO TERMINATE CHARGING OF A BATTERY

[75] Inventors: Yury M. Podrazhansky, Alpharetta; Boris Tsenter, Roswell, both of Ga.

[73] Assignee: Advanced Charger Technology, Inc., Norcross, Ga.

[21] Appl. No.: 08/698,050

[22] Filed: Aug. 15, 1996

Related U.S. Application Data

[60] Provisional application No. 60/002,455, Aug. 16, 1995.

[51] Int. Cl.[7] .............................. H02J 7/10; H01M 10/44
[52] U.S. Cl. ................................ 320/14; 320/21; 320/39; 320/20; 320/4
[58] Field of Search ................................. 320/20, 21, 14, 320/39, 4

[56] References Cited

U.S. PATENT DOCUMENTS

| | | | |
|---|---|---|---|
| 3,617,851 | 11/1971 | Dupuy | 320/22 |
| 4,745,349 | 5/1988 | Palanisamy et al. | 320/22 |
| 4,878,007 | 10/1989 | Gábor et al. | 320/14 |
| 5,204,611 | 4/1993 | Nor et al. | 320/21 |
| 5,291,117 | 3/1994 | Rydborn | 320/21 |
| 5,307,000 | 4/1994 | Podrazhansky et al. | 320/21 X |
| 5,412,306 | 5/1995 | Meadows et al. | 320/20 |
| 5,481,174 | 1/1996 | Martin et al. | 320/21 X |
| 5,600,226 | 2/1997 | Falcon | 320/20 |

OTHER PUBLICATIONS

Floyd L. William, et al., Article entitled, Rechargeable Alkaline Battery System.

Primary Examiner—Peter S. Wong
Assistant Examiner—K Shin
Attorney, Agent, or Firm—A. Jose Cortina; James L. Ewing, IV; Kilpatrick Stockton LLP

[57] ABSTRACT

An apparatus and method for charging a battery are described in a technique wherein charge pulses are followed by discharge pulses and then first rest periods and other discharge pulses followed by second rest periods. Selected ones of the second rest periods are extended in time to enable a battery equilibrium to be established and the open circuit voltage of the battery to settle down and reflect an overcharging condition of the battery. By comparing the open circuit voltages measured during different extended second rest periods small voltage decreases can be reliably detected and used to determine an overcharging condition such as when gases are generated and affect the open circuit voltage. Once overcharging is detected the battery charging is stopped.

33 Claims, 4 Drawing Sheets

METHOD AND APPARATUS FOR DETERMINING WHEN TO TERMINATE CHARGING OF A BATTERY

PRIOR APPLICATIONS

This patent application is a continuation of, and claims priority from, a United States Provisional patent application entitled Method Of Effective Charge Termination For Rechargeable Batteries And Cells, filed with The United States Patent and Trademark Office on Aug. 16, 1995 bearing Ser. No. 60/002,455 and filed by Yury M. Podrazhansky and Boris Tsenter.

FIELD OF THE INVENTION

This invention generally relates to a method and apparatus for charging a battery and more particularly to determining when charging of a sealed battery should be terminated.

BACKGROUND OF THE INVENTION

The increase in the use of rechargeable batteries in recent years has also made it important to make it convenient for consumers to use the batteries by speeding up their recharging. Generally, the battery charging process takes an inconveniently long time and when high currents are employed to quicken the charging process an undesirable battery heating and loss of battery cycle life frequently occurs.

Techniques have been proposed to rapidly charge a battery, see for example U.S. Pat. Nos. 5,307,000 and 5,204,611. The U.S. Pat. No. 5,307,000 patent describes a charging technique wherein a charge pulse is followed by a discharge pulse of much shorter duration followed by a first rest period and the another discharge pulse followed by a second rest period. The U.S. Pat. No. 5,307,000 patent is incorporated herein by reference thereto.

Fast charging processes should, however, have reliable techniques for termination of the process. One proposed method relies upon sensing battery temperature and terminating battery charging when the temperature becomes too high. As a practical matter, however, the temperature warning is sensed too late thus leading to an overheating of the battery. When the charging process uses charging pulses followed by discharge pulses with rest periods in between them particular care should be taken to avoid overheating of the battery.

Another technique for terminating a battery charging relies upon sensing the battery voltage and its negative change. This technique, however, does not provide a reliable indicator of the completion of a charging cycle because the battery voltage is not stable and varies as a function of the battery temperature and charge cycle history. Also, the sensing of a negative battery slope in the battery voltage as a function of time tends to be masked by the same slope effect from battery temperature changes. Reliance upon sensing battery voltage changes while the battery is under load or being charged is a coarse approach and should not be relied upon because of the effects from temperatures or high charging currents.

Another known technique for termination of the charging of a battery is based upon the simple passage of a particular length of time. Such an approach, if it is to work reasonably accurately, depends upon an assumption of a particular state of charge at the start of the charge cycle. Since this is not commonly known, there is a tendency to either over or under charge the battery.

In the charging technique described in U.S. Pat. No. 5,204,611 the battery or cell voltage is sensed during an interval when the charging current is interrupted and is then compared with a preset reference voltage. The comparison signal is then used to control the charging current. The problem associated with this technique is in choosing the right value for the reference voltage. This voltage should be a function of the battery's past charge cycle history, but is fixed at a particular value for practical reasons.

The Russian patent 1129675, which issued Dec. 15, 1984, suggests polarization and depolarization pulses with a rest period charging algorithm. The described technique, however, has disadvantages because the voltage measured during charging to determine when to terminate the charging process varies up to as much as 30%.

Hence, there exists a need for an effective method for terminating the rapid charging of a battery without excessive heating and electrolyte decomposition.

SUMMARY OF THE INVENTION

In one technique for charging a battery in accordance with the invention the charging current is applied in a pulse to a battery and the charge pulse is followed by a depolarizing pulse and then a first rest period which is followed by a depolarizing pulse followed by a second rest period. This second rest period is extended from time to time to enable the measurement of the battery's open circuit voltage during an equilibrium state of the battery when the open circuit voltage is a reasonably accurate indication of any overcharge condition.

Hence, during the extended second rest period the open circuit voltage, $V_{oc}$, of the battery is monitored. When the open circuit voltage indicates a certain battery charge level, the rest period is lengthened for a sufficient time to enable the open circuit voltage to reflect the occurrence of gas evolution in the battery from the charge cycles. The determination of when the open circuit voltage during an extended rest period is indicative of gas evolution, and thus is approaching a full battery charge, depends upon the type of battery being charged.

Another open circuit voltage measurement during an extended second rest period made and compared with the previous measurement. The second measurement typically is made at an interval that is selected to reduce the overall charging time. When the comparison indicates a negative slope in the open circuit voltage, the battery is deemed to be fully charged and the charging process must terminate.

By sensing the battery open circuit voltage during a second or later extended rest period in the charging process there is no influence from the internal impedance of the battery on this voltage and the decision to terminate the charging process becomes more reliable. By using either the second or some other subsequent rest period to measure the open circuit voltage there is a greater sensitivity to the occurrence of oxygen evolution and a negative value for the rate of change of the open circuit voltage becomes a more reliable indicator of when to terminate charging. The measuring of the open circuit voltage preferably should be at a time during an extended second or other rest period when the battery is at or near equilibrium, namely after the effect of the charge pulses has decayed and before the onset of a self-discharge mode.

With a battery charging technique in accordance with the invention overheating of the battery and depletion of the electrolyte as a result of overcharging can be avoided. The technique can be applied to various batteries such as nickel-cadmium, nickel-metal-hydride, nickel hydrogen, nickel-zinc, manganese-zinc and sealed silver-zinc cells.

It is, therefore, an object of the invention to provide a method for rapidly charging a battery and terminating the charging process without significant overcharging while minimizing decomposition of the electrolyte. It is a further object of the invention to provide a technique for rapidly charging a battery and controlling the charging process in such manner as to prevent overcharging and gas evolution.

These and other objects and advantages of the invention can be understood from the following detailed description of the invention in conjunction with the drawings wherein:

DETAILED DESCRIPTION OF THE DRAWINGS

The use of decimals after a numeral herein refers to a specific item while use of the numeral alone without a decimal refers to the item or items in general.

Figure 1:
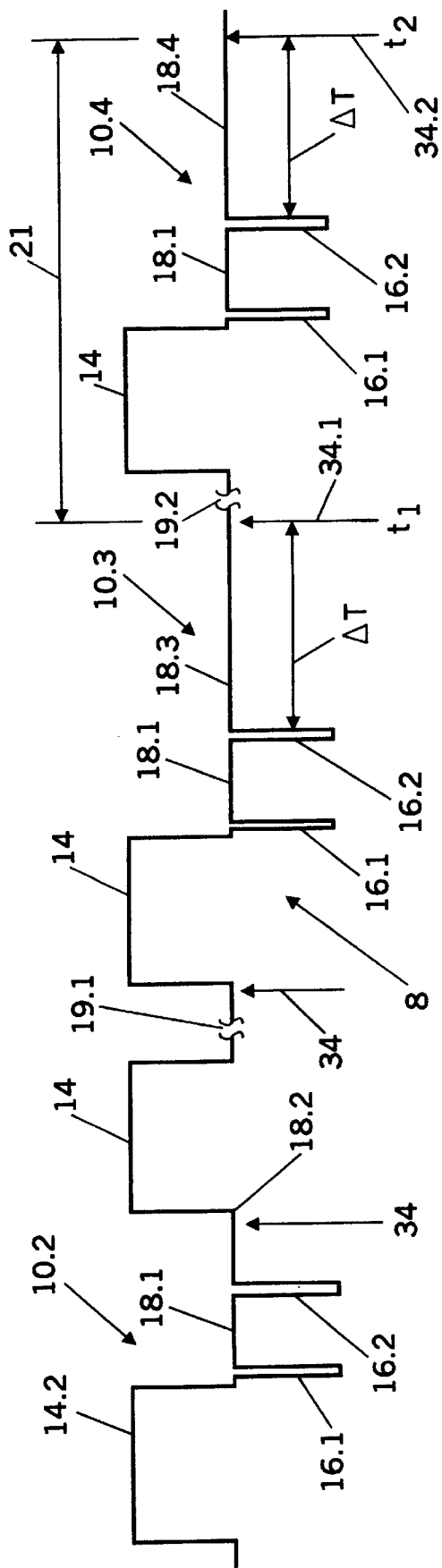
FIG. 1 is plot of a charge cycle used in the practice of the invention.

The plot 8 of FIG. 1 is illustrative for a nickel-cadmium battery, though it should be understood that the invention can be used with many different types of batteries. FIG. 1 shows charging cycles 10 using the charge pulses and rest periods as shown and described in the aforementioned '000 patent. Plot 8 also illustrates the use of extended rest-periods in accordance with the invention. Plot 8 represents the charging current which has a charge pulse 14 followed by a first depolarizing pulse 16.1, of much shorter duration, followed by a first rest period 18.1 during which there is neither a charging nor a discharging current. As described in the '000 patent the charging cycle 10 includes a second discharge or depolarizing pulse 16.2 followed by a second rest period 18.2. Additional pulses and rest periods 18 could be used in a charge cycle 10. The charge cycles are continued as suggested with the line breaks at 19.1 and 19.2.

The process and mechanism for achieving the regular charge cycles are as described in the aforementioned '000 patent and need not be further described herein since the latter patent is incorporated herein by reference thereto.

After a charge pulse 14 and in the absence of charge cycles such as 10, the open circuit voltage, $V_{oc}$, at the end of the charge pulse 14 slowly diminishes to stabilize at some time. The voltage difference, $\Delta V_{co}$, between the open circuit voltage as measured at a time $t_1$ and a subsequent time $t_2$ can be indicative of the onset of oxygen evolution and thus also that battery charging should be terminated. Normally, in the absence of depolarizing pulses 16 the time for the open circuit voltage to register gas evolution takes a long time of the order of more than about 800 milliseconds or more. This process is made much shorter with the invention.

In the charging process in accordance with the invention as show in FIG. 1 the open circuit voltage is measured during an extended second rest period such as 18.3 at a time $t_1$ and after a delay of $\Delta T$ following the second discharge pulse 16.2 in the charge cycle 10.3. At time $t_2$ during a subsequent second extended rest period 18.4 a second open circuit voltage measurement is made to obtain a reliable indication of the onset, or lack thereof, of oxygen evolution. The determination of the difference between these measurements or $\Delta V_{co}$ during subsequent extended second rest periods may occur at prescribed intervals 21, that is the time between $t_1$ and $t_2$, from each other. The length of the intervals are selected for a minimum impact on the duration of the entire charging process. For example, the intervals 21 during the start of battery charging can be set at say, once every several or five minutes, and once the battery achieves a predetermined voltage level the intervals 21 shortened to once every 30 to 40 seconds.

The time needed for an extended rest period to be suitable for a second measurement of the open circuit voltage is likely to vary with different batteries. An extended rest period 18.3 should be sufficiently long to reach a battery equilibrium stage after the effects of the charge pulses and before the onset of a self-discharge mode. In general an extended second rest period can be of the order and in the range from about 20 to about 250 milliseconds and typically about 150 milliseconds should be sufficient.

Figure 3:
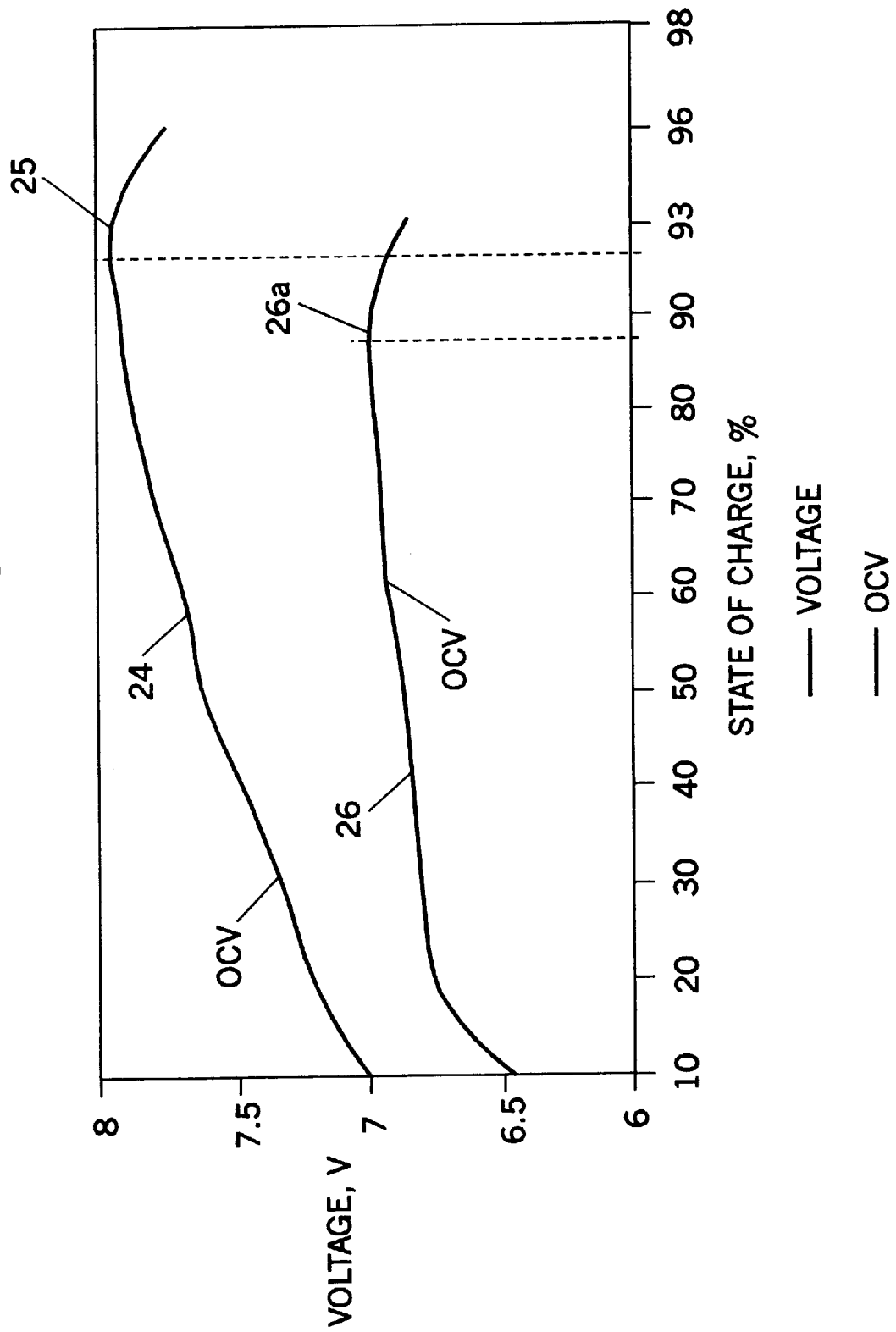
FIG. 3 is plot of curves of a battery voltage when no extended second rest period is used and the battery's open circuit voltage during an extended second rest period and as a function of the percentage of the battery's state of charge.

FIG. 3 is illustrative of the advantages in using the open circuit voltage as an indicator of the time to terminate the charging process when pulse type charging and discharging cycles are used. Curve 24 represents the battery voltage during charging for a nickel-cadmium battery as a function of that state of charge of the battery. Curve 24 shows that the battery voltage reaches a peak level at 25 at when the battery charge is at about a 93% state of charge. After peak 25 the battery voltage shows a decline even though the charging process is continued because battery temperature increases and gas evolution processes begin to take place. Curve 26 shows the open circuit voltage as a function of the state of charge with a peak being reached at 26a at about 88% or less. This means that the open circuit voltage can serve as an earlier warning before gas evolution and other degenerate processes begin to take effect.

Figure 2:
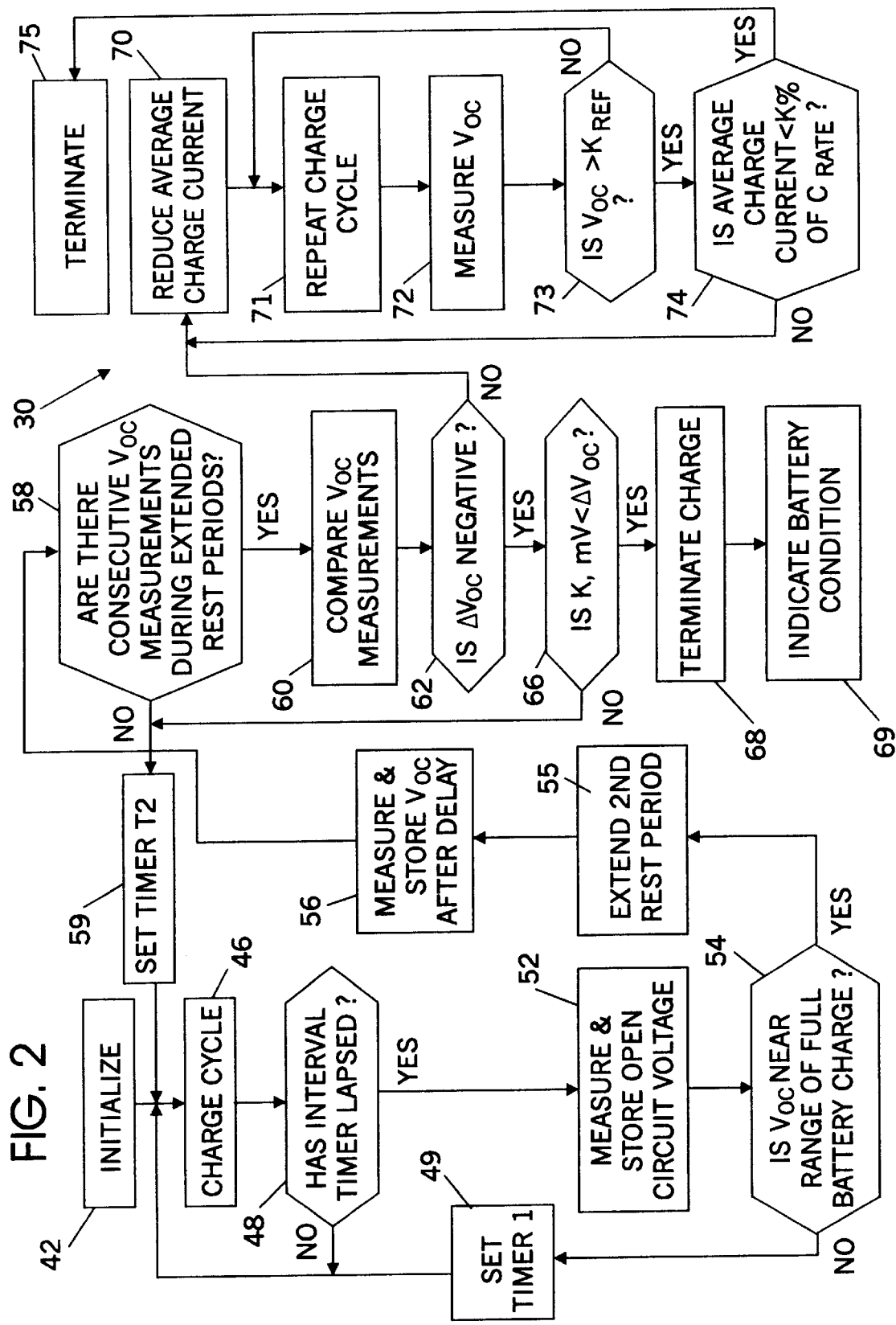
FIG. 2 is an illustrative flow diagram for a microprocessor to practice the invention.
Figure 4:
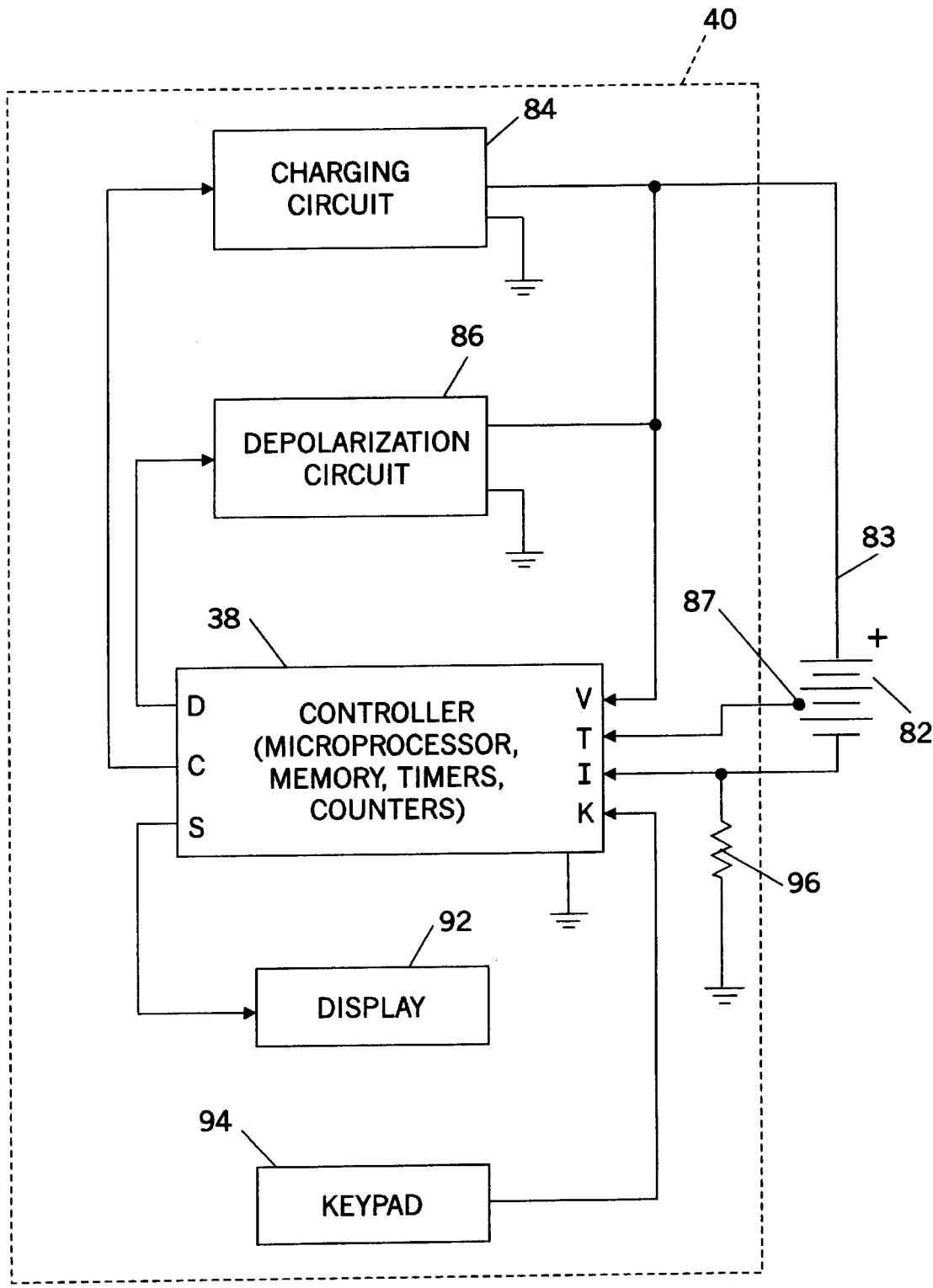
FIG. 4 is a block diagram for a circuit used to charge a battery in accordance with the technique of the invention.

With reference to FIGS. 1 and 2 an illustrative technique 30 is shown for determining when to terminate charging of a battery. In the charging process of the invention termination occurs when the value of $V_{oc}$, as measured from time to time during an extended rest period, shows a negative rate of change. This can be determined with a technique as shown in FIG. 2 with a microprocessor 38 (see FIG. 4) used to control the charging process. A circuit 40 for implementing such battery charging and its termination is shown in FIG. 4.

During each extended second rest period of a charge cycle 10 the open circuit voltage is measured as suggested with arrows 34. When the $V_{co}$ reaches a desired level the second rest period 18.3 is extended as illustrated at charge cycles 10.3 and 10.4 to measure and detect a negative $\Delta V_{co}$. During the extended rest period the open circuit voltage, once it is within a predetermined range depending upon the type of battery involved, becomes sensitive to the occurrence of oxygen evolution due to over charging and responds to this condition with a reduction in the value of $V_{oc}$.

With reference to FIG. 2 at 42 the microprocessor 38 is initialized with appropriate data such as the type of battery that is used and the parameters needed to operate the program including the charge cycles 10, the intervals 21 between times for measuring the open circuit voltage during an extended second rest period, the ranges for the open circuit voltage that are indicative of being near a full charge and the time needed for an extended second rest period to enable the open circuit voltage to stabilize after the extended rest period begins, the intervals selected for open circuit voltage measurements during extended second rest periods and the amount of negative voltage drop that is to occur for deciding when the charging process should be terminated.

For example, when the open circuit voltage for a nickel-cadmium or a metal hydride battery has increased into a range of $1.35 < V_{oc} < 1.55$ volts per cell then a subsequent negative trend in its value is identified as the time to terminate the charging process. For nickel-zinc and silver-zinc cells the range is $1.9 < V_{oc} < 2.0$ volts per cell. These values are, therefore, entered into the program as well as the particular battery type and the number of cells in the battery. The ultimate open circuit voltages indicative of fully charged batteries for the different cells are at higher levels, such as $1.50 < V_{oc} < 1.60$ per cell for nickel-cadmium, $1.90 < V_{oc} < 2.00$ per cell for nickel-zinc and silver-zinc.

In the illustrative technique 30 in FIG. 2 a first charge cycle 10 is implemented at 46 followed at 48 by a test whether the timer interval has lapsed. If not then a return is made to step 46 and charge cycles are continued until the interval has lapsed. The second rest period is then extended at 50 and a measurement and storage of the open circuit voltage is made at 52 during an extended second rest period such as 18.3. The measuring of the open circuit voltage uses an appropriate AND converter in the apparatus illustrated in FIG. 4.

The open circuit voltage is determined preferably during at least a second rest period following the second depolarizing pulse 16.2. However, it is to be understood that other rest periods may be employed. The second or later rest period is preferred because hydrogen generation can be more precisely recognized. The open circuit voltage is initially measured during each second rest period until it reaches the reference voltage level where it can be an indicator of gas evolution. Once that level is reached. The second rest period 18 is extended for a time sufficient to enable the battery to reach an equilibrium condition where the effect of the charge pulses has essentially disappeared and before a discharge mode has begun. The battery open circuit voltage is measured in the vicinity of battery equilibrium to become an indicator of gas evolution. The process of extending the second rest period and measuring the open circuit voltage is continued at intervals that are sufficiently long to observe drops in the open circuit voltage and not too long to avoid overcharging the battery. If too long, the tendency of a battery to begin a normal self-discharge when there is no charge is likely to influence the measurement of the open circuit voltage.

After the open circuit voltage is measured and stored in a suitable memory at 52 a test is made at 54 whether the open circuit voltage is in a desired range, for the particular type of battery being charged, to indicate an overcharge condition. If not, then a return is made to step 46 to continue the charging process. If desired the measurement of the open circuit voltage can be done with every second rest period or at some time interval as can be set at with the timer at step 49 or the interval can be set during the initializing step at 42.

If the test at 54 was positive, then the second rest period is extended for the current charge cycle at 55 another $V_{oc}$ measurement is made at 56 after a delay selected to reach battery equilibrium condition and a test is made at 58 whether two consecutive open circuit voltage measurements have been made. If not the program is returned to step 46 with a setting of an interval timer at 59 until the test at 58 yields a positive response.

At 60 a comparison between open circuit voltage measurements related to extended second rest periods is made. This comparison can be between $V_{co}$ measurements made during the consecutive or different extended second rest periods 18. When the comparison done at 60 indicates at 62 that the most recent open circuit voltage measurement does not show a decrease, a reduction of the average charge current is made at 70. This reduction can be done in a number of different ways, such as by reducing the amplitude, or pulse duration or both of the charge pulse 14 or by increasing the rest periods all of which have the effect of reducing the average charge current.

After step 70 a new charge cycle is applied at 71 and the open circuit voltage is measured during an extended second rest period at 72. A test is then made at 73 whether the open circuit voltage is greater than the reference value used at step 54 and if not the a return is made to step 71. If so, a test is made at 74 whether the average current has been reduced to less than some minimum value. This can be in the range of some percentage of the charging rate and depends upon the particular battery being charged. The range may be from 20 to 50 percent of the charge rate. If test 74 is negative a return is made to step 70 for a further reduction in the average charge current. If so, then the charge process is terminated at 75.

When the comparison from step 60 shows a decrease, in other words that $\Delta V_{oc}$ is negative, a test is made at 66 that this negative value is at least indicative of gas evolution in the battery. Typically this means that $\Delta V_{oc}$ is greater than some minimum value such as at least greater than 5 to 10 millivolts per cell. The initial open circuit voltage drop is primarily attributable to oxygen generation due to overcharging, when one of the cell plates, such as cadmium, begins to absorb oxygen, the voltage drops and temperature starts to rise. This results in a voltage drop that can vary from about 10 to about 100 millivolts per cell. This range tends to vary somewhat depending upon the thermal condition of the battery.

Once the test result at 66 indicates a significant negative change in $V_{oc}$ the charging process is terminated at 68 and further battery monitoring can then begun or a visual or oral indication of charge completion can be made at 69.

FIG. 5 illustrates the apparatus 40 for implementing the technique of the invention. A battery 82 is shown having its positive terminal 83 connected to a charging circuit 84 and a depolarization or discharge circuit 86. A temperature sensor 87 in the battery 82 and the positive terminal 88 are connected to microprocessor 38. A display 92 and keypad 94 are coupled to the processor 38. A current sensor 96 in the form of a resistor is shown connecting the negative terminal 98 of battery 82 to ground with the negative terminal also connected to the processor 38. Operation of the apparatus 80 is as described above and in the aforementioned copending patent application. An A/D converter is used between the analog voltages being measured and the processor 38.

Having thus described one embodiment for practicing the invention, its advantages can be appreciated and variations from the described embodiment can be made without departing from the scope of the invention as defined by the following claims. The invention is described herein by measuring the open circuit voltage during an extended second rest period, it is to be understood, however, that one could measure the open circuit voltage during a first or other rest period at a time when the battery equilibrium point has been reached. In such case a single rest period could be used with a single discharge pulse whose magnitude or duration or both are adjusted to enable the battery to achieve equilibrium in a reasonably short time.

We claim:

1. A method for charging a battery comprising the steps of:
   generating repetitive charging cycles having charging and multiple depolarization pulses and including at least two rest periods during which there is neither a charge nor a discharge current;
   measuring the open circuit voltage of the battery during at least an extended second or later rest period of charge cycles separated in time;
   comparing measured open circuit voltages; and
   terminating the charging cycles when the comparison step yields a negative change in the open circuit voltage in excess of a predetermined amount.

2. The method for charging a battery as claimed in claim 1 wherein the comparing step further comprises the step of comparing the open circuit voltages with open circuit voltage measurements of the battery in excess of a predetermined reference voltage level.

3. The method for charging a battery as claimed in claim 2 wherein the measuring step is commenced during rest periods following a first rest period in the charge cycles.

4. The method for charging a battery as claimed in claim 3 wherein said rest periods during which said measuring step is done comprise the second rest period in said charge cycles.

5. The method for charging a battery as claimed in claim 2 wherein said measuring step is done a predetermined time after a said at least second rest period has begun.

6. The method for charging a battery as claimed in claim 5 wherein said measuring step is done at a time which is from about 10 milliseconds to about several minutes after a said rest period has begun.

7. The method for charging a battery as claimed in claim 1 wherein said measuring step is done at a repetition rate which is initially at one rate and increased to a higher rate when the measured open circuit voltage has achieved a first predetermined level.

8. The method for charging a battery as claimed in claim 6 wherein said measuring step is done initially at a rate of about once every several minutes and then increased to a rate higher than about every minute.

9. The method for charging a battery as claimed in claim 1 wherein said charge cycles terminating step terminates said battery charging cycles after said open circuit voltage comparison step detects a drop in sequential open circuit voltage measurements that is in the range from about 10 to about 100 millivolts.

10. The method for charging a battery as claimed in claim 2 wherein said comparing step compares said battery open circuit voltages when these have achieved a predetermined level that is a function of the type of battery.

11. The method for charging a battery as claimed in claim 10 wherein said comparing step includes the step of generating predetermined reference voltage levels, $V_{oc,ref}$, that are a function of the battery type involved and are selected from the group consisting of:
   a. $1.35 < V_{oc,ref} < 1.55$ per cell for nickel-cadmium,
   b. $1.35 < V_{oc,ref} < 1.55$ per cell for metal-hydride,
   c. $1.70 < V_{oc,ref} < 1.80$ per cell for nickel-zinc, and
   d. $1.80 < V_{oc,ref} < 1.90$ per cell for silver-zinc.

12. A method for charging a battery comprising the steps of:
   generating repetitive charging cycles having charging and single depolarization pulses and including single rest periods during which there is neither a charge nor a discharge current;
   measuring the open circuit voltage of the battery during an extended single rest period of charge cycles separated in time and at times in the rest period when the battery is in a state of equilibrium;
   comparing measured open circuit voltages; and
   terminating the charging cycles when the comparison step yields a negative change in the open circuit voltage in excess of a predetermined amount.

13. The method for charging a battery as claimed in claim 12 wherein the comparing step further comprises the step of comparing the open circuit voltages with open circuit voltage measurements of the battery in excess of a predetermined reference voltage level.

14. The method for charging a battery as claimed in claim 13 wherein the measuring step is commenced during rest periods following predetermined times after the start of the rest periods in the charge cycles.

15. The method for charging a battery as claimed in claim 14 wherein said measuring step is done at a time which is from about 20 milliseconds to about 250 milliseconds after a said rest period has begun.

16. The method for charging a battery as claimed in claim 12 wherein said measuring step is done at a repetition rate which is initially at one rate and increased to a higher rate when the measured open circuit voltage has achieved a first predetermined level.

17. The method for charging a battery as claimed in claim 12 wherein said measuring step is done initially at a rate higher than about every minute.

18. The method for charging a battery as claimed in claim 12 wherein said charge cycles terminating step terminates said battery charging cycles after said open circuit voltage comparison step detects a drop in sequential open circuit voltage measurements that is greater than about 10 millivolts.

19. The method for charging a battery as claimed in claim 13 wherein said comparing step compares said battery open circuit voltages when these have achieved a predetermined level that is a function of the type of battery.

20. A method for charging a battery comprising the steps of:
   generating repetitive charging cycles having charging and multiple depolarization pulses and including at least two rest periods during which there is neither a charge nor a discharge current;
   measuring the open circuit voltage of the battery during at least an extended second or later rest period of charge cycles separated in time and at a time when the battery is in a state of equilibrium;
   comparing measured open circuit voltages;
   reducing the average charging current when the comparison step fails to yield a drop in the measured open circuit voltage; and
   terminating the charging cycles when the comparison step yields a negative change in the open circuit voltage.

21. The method as claimed in claim 20 wherein the step of reducing the average current comprises reducing the amplitude of charge pulses in the charge cycles.

22. The method as claimed in claim 20 wherein the step of reducing the average current comprises reducing the duration of charge pulses in the charge cycles.

23. The method as claimed in claim 20 wherein the step of reducing the average current comprises increasing the duration of rest periods in the charge cycles.

24. The method as claimed in claim 20 wherein the step of reducing the average current comprises increasing the duration or amplitudes of discharge pulses in the charge cycles.

25. A method for charging a battery comprising the steps of:

generating repetitive charging cycles having charging and single depolarization pulses and including single rest periods during which there is neither a charge nor a discharge current;

measuring the open circuit voltage of the battery during the rest periods of charge cycles separated in time and at a time when the battery is in a state of equilibrium;

comparing measured open circuit voltages;

reducing the average charging current when the comparison step fails to yield a drop in the measured open circuit voltage; and terminating the charging cycles when the comparison step yields a negative change in the open circuit voltage.

26. The method as claimed in claim 25 wherein the step of reducing the average current comprises reducing the amplitude of charge pulses in the charge cycles.

27. The method as claimed in claim 25 wherein the step of reducing the average current comprises reducing the duration of charge pulses in the charge cycles.

28. The method as claimed in claim 25 wherein the step of reducing the average current comprises increasing the duration of rest periods in the charge cycles.

29. The method as claimed in claim 25 wherein the step of reducing the average current comprises increasing the duration or amplitudes of discharge pulses in the charge cycles.

30. An apparatus for charging a battery comprising the steps of:

means for forming repetitive charging cycles having charging and depolarization pulses and including at least two rest periods during which there is neither a charge nor a discharge current;

means for measuring the open circuit voltage of the battery during at least the second or later rest period of charge cycles separated in time;

means for comparing measured open circuit voltages; and means for terminating the charging cycles when the comparison step yields a negative change in the open circuit voltage in excess of a predetermined amount.

31. An apparatus for charging a battery comprising the steps of:

means for forming repetitive charging cycles having charging and single depolarization pulses and including single extended rest periods during which there is neither a charge nor a discharge current;

means for measuring the open circuit voltage of the battery during the rest period of charge cycles separated in time and at times in the rest period when the battery is in a state of equilibrium;

means for comparing measured open circuit voltages; and means for terminating the charging cycles when the comparison step yields a negative change in the open circuit voltage in excess of a predetermined amount.

32. An apparatus for charging a battery comprising the steps of:

means for generating repetitive charging cycles having charging and multiple depolarization pulses and including at least two rest periods during which there is neither a charge nor a discharge current;

means for measuring the open circuit voltage of the battery during at least an extended second or later rest period of charge cycles separated in time and at a time when the battery is in a state of equilibrium;

means for comparing measured open circuit voltages;

means for reducing the average charging current when the comparison step fails to yield a drop in the measured open circuit voltage; and means for terminating the charging cycles when the comparison step yields a negative change in the open circuit voltage.

33. An apparatus for charging a battery comprising the steps of:

means for generating repetitive charging cycles having charging and single depolarization pulses and including single rest periods during which there is neither a charge nor a discharge current;

means for measuring the open circuit voltage of the battery during an extended rest periods of charge cycles separated in time and at a time when the battery is in a state of equilibrium;

means for comparing measured open circuit voltages;

means for reducing the average charging current when the comparison step fails to yield a drop in the measured open circuit voltage; and means for terminating the charging cycles when the comparison step yields a negative change in the open circuit voltage.

* * * * *